(12) United States Patent
Shope (10) Patent No.: US 12,245,582 B1
(45) Date of Patent: Mar. 11, 2025

(54) MOUNTING SYSTEM FOR ANIMAL TRAPS AND BAIT

(71) Applicant: Casey W. Shope, Gladstone, MI (US)

(72) Inventor: Casey W. Shope, Gladstone, MI (US)

( * ) Notice: Subject to any disclaimer, the term of this patent is extended or adjusted under 35 U.S.C. 154(b) by 75 days.

(21) Appl. No.: 17/237,441

(22) Filed: Apr. 22, 2021

Related U.S. Application Data (60) Provisional application No. 63/015,911, filed on Apr. 27, 2020.

(51) Int. Cl.
*A01M 23/26* (2006.01)
*A01M 23/24* (2006.01)
*A01M 25/00* (2006.01)

(52) U.S. Cl.
CPC .......... *A01M 23/26* (2013.01); *A01M 23/245* (2013.01); *A01M 25/002* (2013.01)

(58) Field of Classification Search
CPC ..... A01M 23/24; A01M 23/26; A01M 23/245
USPC .................. 43/88, 89, 91, 92, 93, 94, 96
See application file for complete search history.

(56) References Cited

U.S. PATENT DOCUMENTS

| | | | | |
|---|---|---|---|---|
| 344,994 A * | 7/1886 | Seymour | A01M 23/26 43/93 |
| 356,635 A * | 1/1887 | Golding | A01M 23/26 43/92 |
| 868,917 A * | 10/1907 | Donlon | A01M 23/26 43/92 |
| 1,296,437 A * | 3/1919 | Sitts | A01M 23/26 43/88 |
| 1,337,149 A * | 4/1920 | Nelson | A01M 23/26 43/88 |
| 1,376,308 A * | 4/1921 | Andrews | A01M 23/26 43/92 |
| 1,577,000 A * | 3/1926 | Smith | A01M 23/26 43/88 |
| 1,831,621 A * | 11/1931 | Cooper | A01M 23/26 43/85 |
| 2,720,050 A | 10/1955 | Pfeiffer | |
| 3,762,094 A * | 10/1973 | Conibear | A01M 23/26 43/92 |
| 3,973,352 A * | 8/1976 | Souza | A01M 23/26 43/92 |
| 4,127,960 A * | 12/1978 | Conibear | A01M 23/26 43/92 |
| 4,458,394 A * | 7/1984 | Schultz | A01M 23/26 24/337 |

(Continued)

FOREIGN PATENT DOCUMENTS

CA 1068481 A * 12/1979 ............ A01M 23/26

OTHER PUBLICATIONS

NLGhostWolf. "110 conibear with modified trigger". YouTube, uploaded by NLGhostWolf, Dec. 22, 2012, (https://www.youtube.com/watch?v=vkVcT-dSupk). Screenshots at 0:33 and 7:48 minutes.*

(Continued)

*Primary Examiner* — Morgan T Jordan
*Assistant Examiner* — Hae Rie Jessica Byun
(74) *Attorney, Agent, or Firm* — Mitchell Intellectual Property Law, PLLC (57) ABSTRACT

A trap-holding bracket and system for holding both conibear style body-gripping traps and leghold type traps, and for holding bait in position relative to such traps.

2 Claims, 11 Drawing Sheets

(56) References Cited

U.S. PATENT DOCUMENTS

| | | | | |
|---|---|---|---|---|
| 4,499,685 | A | * | 2/1985 | Sibley .................. A01M 23/26 |
| | | | | 43/96 |
| 4,766,694 | A | | 8/1988 | Buckley |
| 4,823,504 | A | * | 4/1989 | Ronning .............. A01M 23/26 |
| | | | | 43/96 |
| 9,565,850 | B2 | | 2/2017 | Hagerty |
| 10,492,485 | B1 | | 12/2019 | Shope |
| 2011/0289821 | A1 | * | 12/2011 | Bonnot ................ A01M 23/34 |
| | | | | 43/85 |

OTHER PUBLICATIONS

The Meat Trapper, photo of modified conibear trap from "Conibear School Episode 3: Triggers and Pans" video, Sep. 25, 2015, 1 page, YouTube, U.S.

The Meat Trapper, "Conibear School Episode 3: Triggers and Pans", screenshot of video regarding modified conibear trap (circled in red), Sep. 25, 2015, 1 page, YouTube (https://www.youtube.com/watch?v=_nvR3usCybk), U.S.

Unknown, photo of standard bait holder, photo date unknown, bait holder believed Jan.-Mar. 2020 or earlier, U.S.

Wildlife Control Supplies, Portable Pockets (Visual Attractant & Bait Holder—Single, website advertisement, Jan.-Mar. 2020 or earlier, 1 page, www.wildlifecontrolsupplies.com, U.S.

* cited by examiner

MOUNTING SYSTEM FOR ANIMAL TRAPS AND BAIT

RELATED APPLICATIONS/PRIORITY BENEFIT CLAIM

This application claims the benefit of U.S. Provisional Application No. 63/015,911, filed Apr. 27, 2020 by the same inventor (Shope), the entirety of which provisional application is hereby incorporated by reference.

FIELD

The subject matter of the present application is in the field of devices for supporting animal traps off the ground on elevated supports.

BACKGROUND

Devices for holding or supporting animal traps on stakes, sticks, and the like are generally known. These prior trap holders are generally designed to hold one of two basic types of trap: "conibear" or body-gripping type traps with inner wire jaw ends, and foot- or leg-holding (leghold) traps with a short tang on the end of an inner frame member.

U.S. Pat. No. 9,565,850 to Hagerty discloses a stake-mounted bracket with a planar midsection having a plurality of circular mounting apertures, and a planar angled end section with a plurality of elongated slots for receiving a tang on the inner end of a trap.

U.S. Pat. No. 2,720,050 to Pfeiffer discloses an underwater animal trap support with a hinged platform adjustably mounted on a stake or stake to hold the trap underwater, and to rotate like a weather vane in the underwater current.

U.S. Pat. No. 4,766,694 to Buckley discloses a trap holder in the form of a box with an open end for receiving the wire jaws of a trap, with notches in the side walls adapted to receive the spring arm of the trap to support the trap jaws in an upright position in the box.

U.S. Pat. No. 10,492,485 to Shope discloses a trap-holding bracket for holding both conibear style body-gripping traps and leghold type traps. The bracket comprises a hollow, generally box-shaped body with an enclosed slot in the front wall, horizontal tab arms extending outwardly from the sides of the top and bottom walls to define extended jaw slots configured to receive the inner wire ends of a body-gripping trap, and vertical L-shaped tab arms extending above and/or below the front end wall to define an open-ended lateral slot for receiving an outer base end of a leghold trap with a lateral sliding motion.

BRIEF SUMMARY

In a first form, the present invention is a trap-supporting bracket and trap mounting system similar to the above-referenced Shope '485 patent (the teachings of which are herein incorporated by reference), but with an improved vertical-stake engaging feature in the top and bottom walls to accommodate a wider variety of trap support stakes more securely. The improved bracket further includes a modified rear wall that eliminates the tendency of a vertically-held conibear trap to hang or lean off-level. The modified rear wall further includes raised mounting tabs extending in a vertical plane above and below the rear wall top and bottom edges for improved stability and ease of mounting the rear of the bracket flat against a support.

In a further form, the improved bracket system includes an adapter plate that mates over the bracket to allow it receive a wider conibear trap. The front and rear walls of the adapter plate cover and/or cooperate with the conibear wire jaw notches on the bracket to effectively widen the notch spacing at the front and rear of the bracket.

In a further aspect, the invention comprises a bait holder configured to be slidably and adjustably mounted on a vertical stake above a trap mounted on the stake by the bracket. In a first form, the bait holder comprises an open-ended tubular body with a pair of aligned stake apertures through top and bottom portions of the tubular body adjacent a rear end of the tubular body so that the tubular body can be mounted to extend perpendicularly from the stake. In a second form, the bait holder comprises a bracket-like body with aligned vertical stake apertures, and with a bait-holding arm extending horizontally forward from a front edge of the body, and a stake-engaging bolt extending through an aperture in the rear wall of the body.

In a further aspect, the inventive system includes an improved trigger-setting device for a conibear-type trap, comprising a pan having a hook member on its bottom surface on a first side of the pan, the hook member comprising a spring clip extending outwardly from the first side to rotatably engage a lower end of one of the wire jaws, and an upwardly-facing trigger hook extending partway along the bottom of the pan toward the opposite wire jaw, the trigger hook spaced from the bottom of the pan to receive the opposite wire jaw and set the trap.

Terms of orientation such as "vertical", "horizontal", "top", and "bottom" should be understood in a general and relative sense, and may depend on the installed orientation of the bracket and the orientation of any stake or other support to which the bracket is mounted.

These and other features and advantages of the invention will become apparent from the detailed description below, in light of the accompanying drawings.

DETAILED DESCRIPTION

Figure 1:
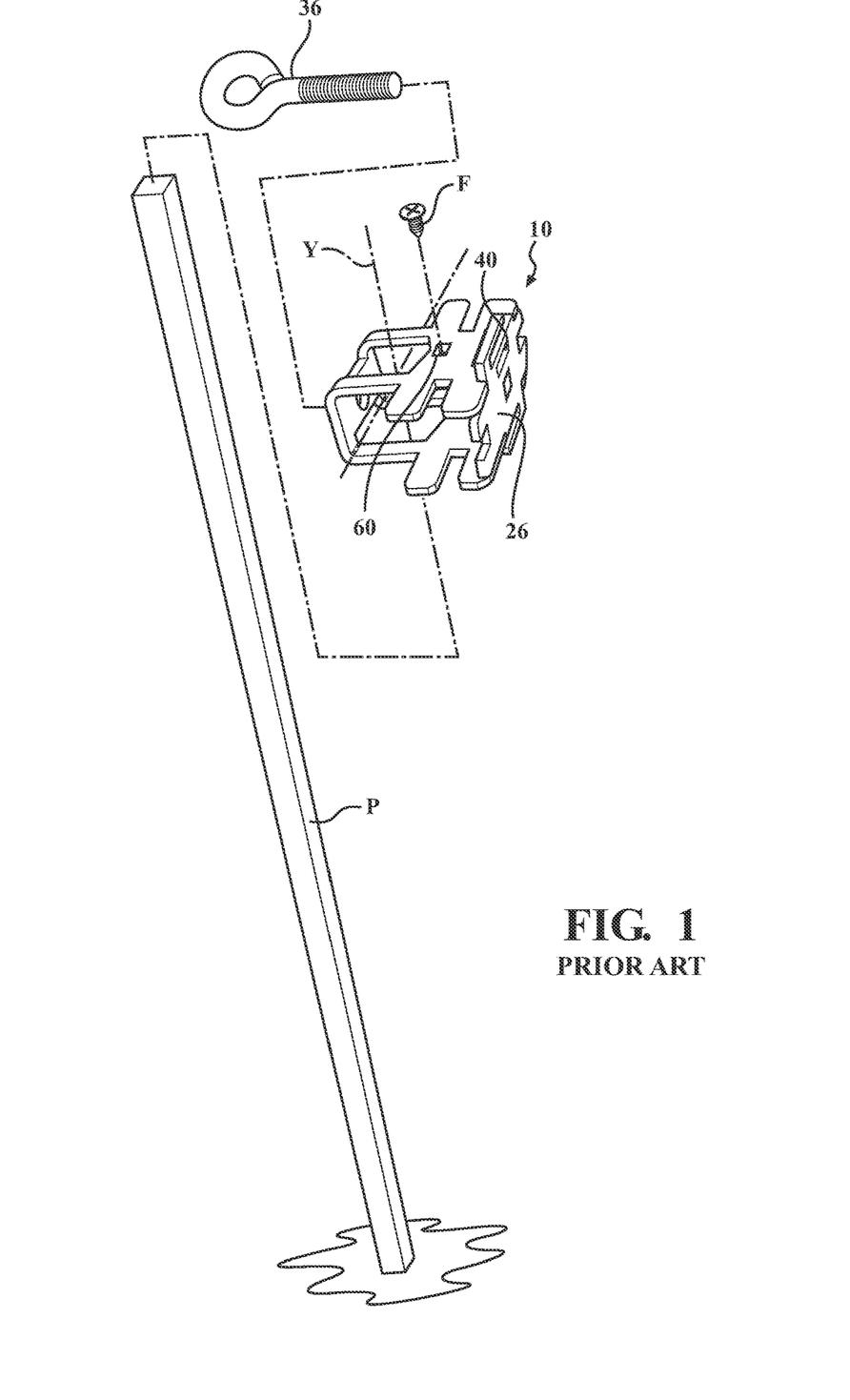
FIG. 1 is a perspective view of a prior art trap-holding bracket, exploded relative to a stake on which it is configured to be mounted.
Figure 1A:
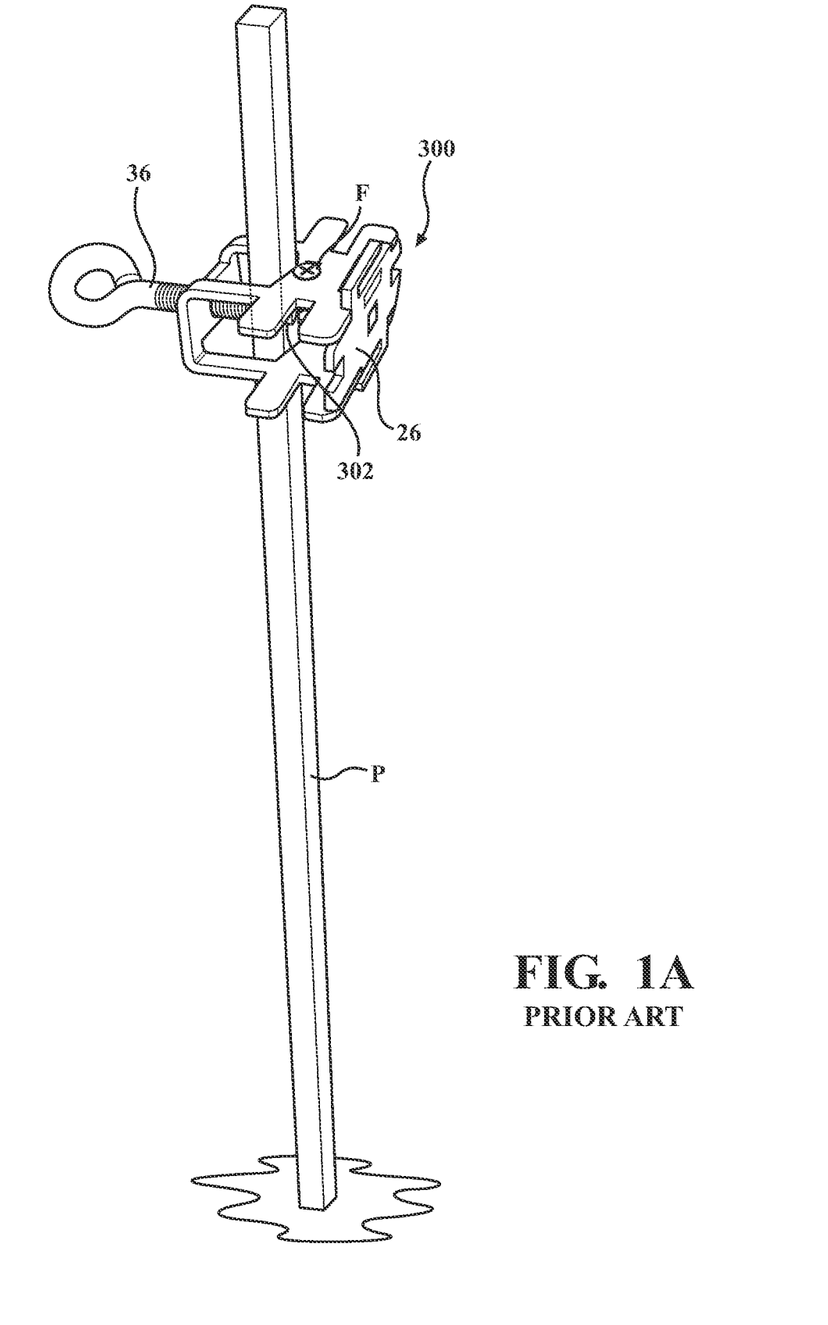
FIG. 1A is similar to FIG. 1, showing the prior trap-holding bracket mounted on the stake.
Figure 1B:
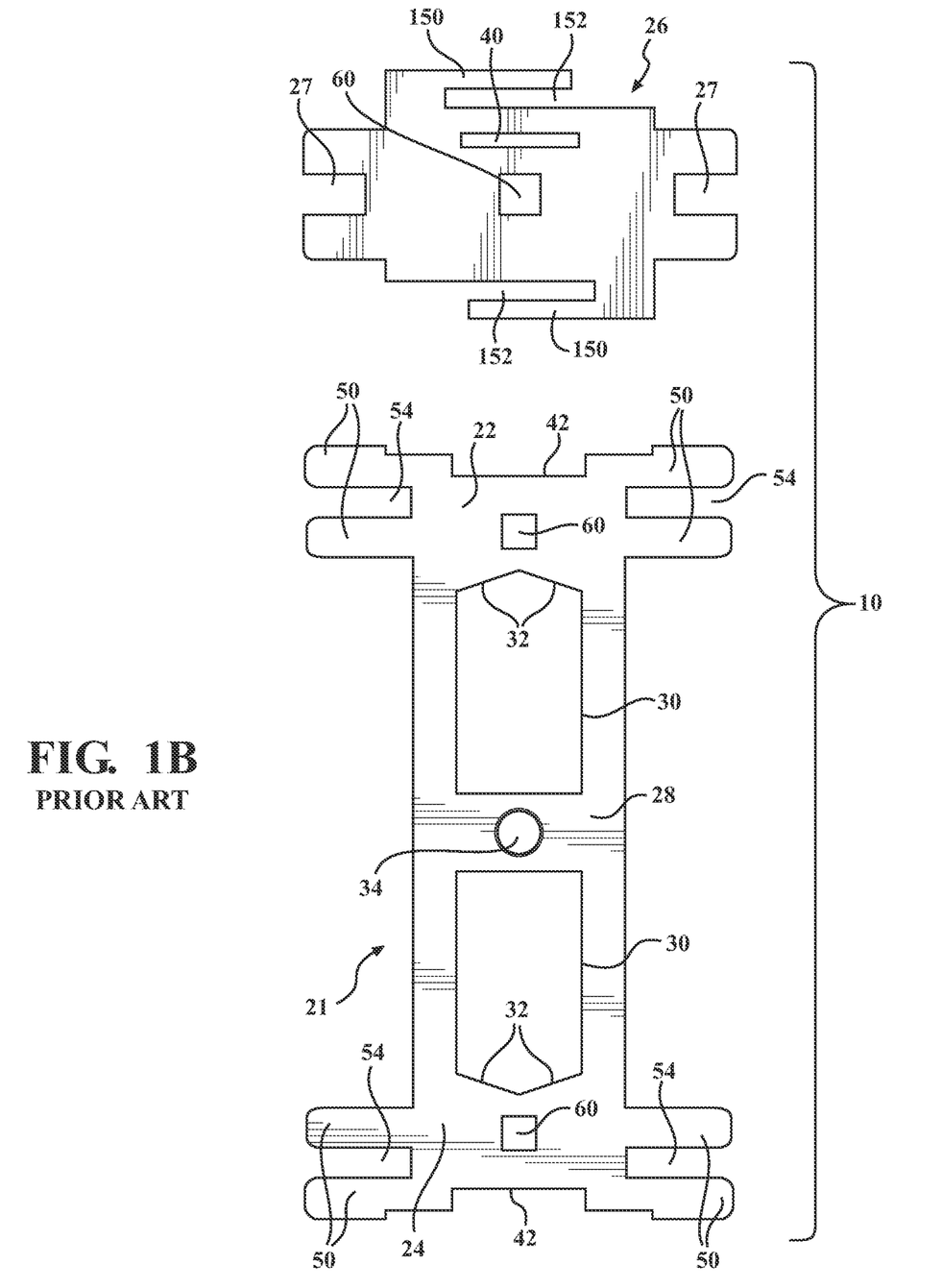
FIG. 1B is a plan view of a metal blank, in two pieces, from which the prior trap-holding bracket of FIG. 1 is formed.

Referring first to FIGS. 1, 1A, and 1B, a prior art trap-holding bracket 10 is shown according to my U.S. Pat. No. 10,492,485, the teachings of which are incorporated herein by reference. Bracket 10 comprises a hollow body 20 having a top wall 22, a bottom wall 24, a front end wall or face 26, and a rear end wall 28. In the illustrated example the bracket is formed from sheet metal, for example a heavy gauge stainless steel, although other metals or non-metal materials such as durable polymers could be used. The illustrated example further has open sides 29 as a preferred option, so that a horizontal stake or equivalent may inserted through the bracket body along axis X to support the bracket horizontally from a riverbank, for example. Alternately, since the open sides 29 are larger than the vertical support apertures 30, bracket 10 can be rotated and mounted vertically on a larger stake inserted vertically along axis Y through the re-oriented side openings 29.

Further in the illustrated example, best shown in FIG. 1B, bracket 10 is formed in two pieces 21 and 26 (blank 26 in the illustrated example comprises the front end wall). The top, bottom, and rear end walls 20, 22, and 28 are formed from flat blank 21 and bent or formed into the generally box-shaped or cuboid structure shown in FIG. 1. Front end wall 26 is formed separately (also flat) and then attached to piece 21 in any known metal-joining manner (for example, welding, joint-forming adhesives, interference fit between parts, swaging, etc.) to close the front end of the hollow body 20.

Top and bottom walls 22, 24 include vertically aligned stake support apertures 30 so that a stake-like support P can be inserted vertically through hollow body 20 along axis Y. A bolt aperture 34 formed in the rear end wall 28 allows a bolt or similar stake-engaging member 36 to be inserted from the rear to clamp bracket 10 to the stake. Bolt aperture 34 may be threaded internally in order to draw and tension the bracket rearwardly against the stake as the bolt 36 is threaded forwardly through aperture 34.

In the illustrated example of FIGS. 1, 1A, and 1B, stake support apertures 30 are generally square in shape, although their shape may vary, and the apertures may be formed with a wedge-shaped forward end defined by angled forward edges 32. The wedge shape helps to center and lock the bracket against a round stake if a rectangular stake corresponding to the size of the apertures is not available, or against any other irregularly-shaped stake, as the clamping member 36 is urged forwardly.

Front end wall 26 may include an enclosed horizontal slot 40 for use in supporting a trap-mounting extension arm (described below). Top wall 22 and possibly other of the hollow body walls may also include an enclosed slot 42 for use with an extension arm in a manner described below when the bracket is in a different orientation or mounted on a different type of support.

Still referring to FIGS. 1, 1A, and 1B, horizontal tab arms 50 extend outwardly from the sides of top and bottom walls 22, 24 in horizontal planes generally aligned with the top and bottom walls 22, 24, respectively, and generally in a direction parallel to front end wall 26 and spaced from each other along the top and bottom walls to form open-ended jaw slots 54. Jaw slots 54 are vertically aligned between the top and bottom walls on their respective sides of the bracket body, and are sized to receive the wire or rod-shaped inner ends of the jaws of a conibear type trap when the inner ends are squeezed together to a cocked or set position. While in the illustrated example a single vertically-spaced pair of jaw slots 54 is formed on each side of the bracket body 20, it is possible to add additional tabs 50 to the sides of the top and bottom walls in order to form additional sets of jaw slots along the sides of the bracket body. The dimensions of tab arms 50 and jaw slots 54 may vary depending on the size or model of the trap being supported therein.

If front end wall 26 is wider than hollow body 20, as in the illustrated example, the outer protruding ends of front end wall 26 may form or include some of the horizontal tab arms 50 to help define jaw slots 54.

Bracket 10 is also provided with a small rectangular aperture 60 on the front end wall 26, and optionally on other of the body walls, suitable for inserting supplemental fasteners such as screws, nails, or wire in order to attach bracket 10 to non-stake supports such as trees, logs, and rocks. It is also possible to provide one or more open notches 27 along the side edges of the front wall for use as fastening points, particularly if using wire.

FIG. 1A shows the trap-holding bracket 10 of FIG. 1, mounted on a stake P extending through the bracket, the bracket 10 capable of supporting an example leg-hold type trap of known type, in a manner disclosed in U.S. Pat. No. 10,492,485, the teachings of which are incorporated herein by reference. Stake P is inserted into firm ground or the bottom of a shallow body of water, the stake support apertures 30 are aligned over the stake, and bracket 10 is slid down the stake to the desired height. Bolt 36 is then threaded through bolt aperture 34 into clamping engagement with stake P to lock bracket 10 at the desired height.

Bracket 10 holds the set trap in a desired trapping position at a predetermined height and rotational angle on stake P, for example next to the entrance or exit of an animal's home, or along a route the animal is expected to travel.

Figure 2:
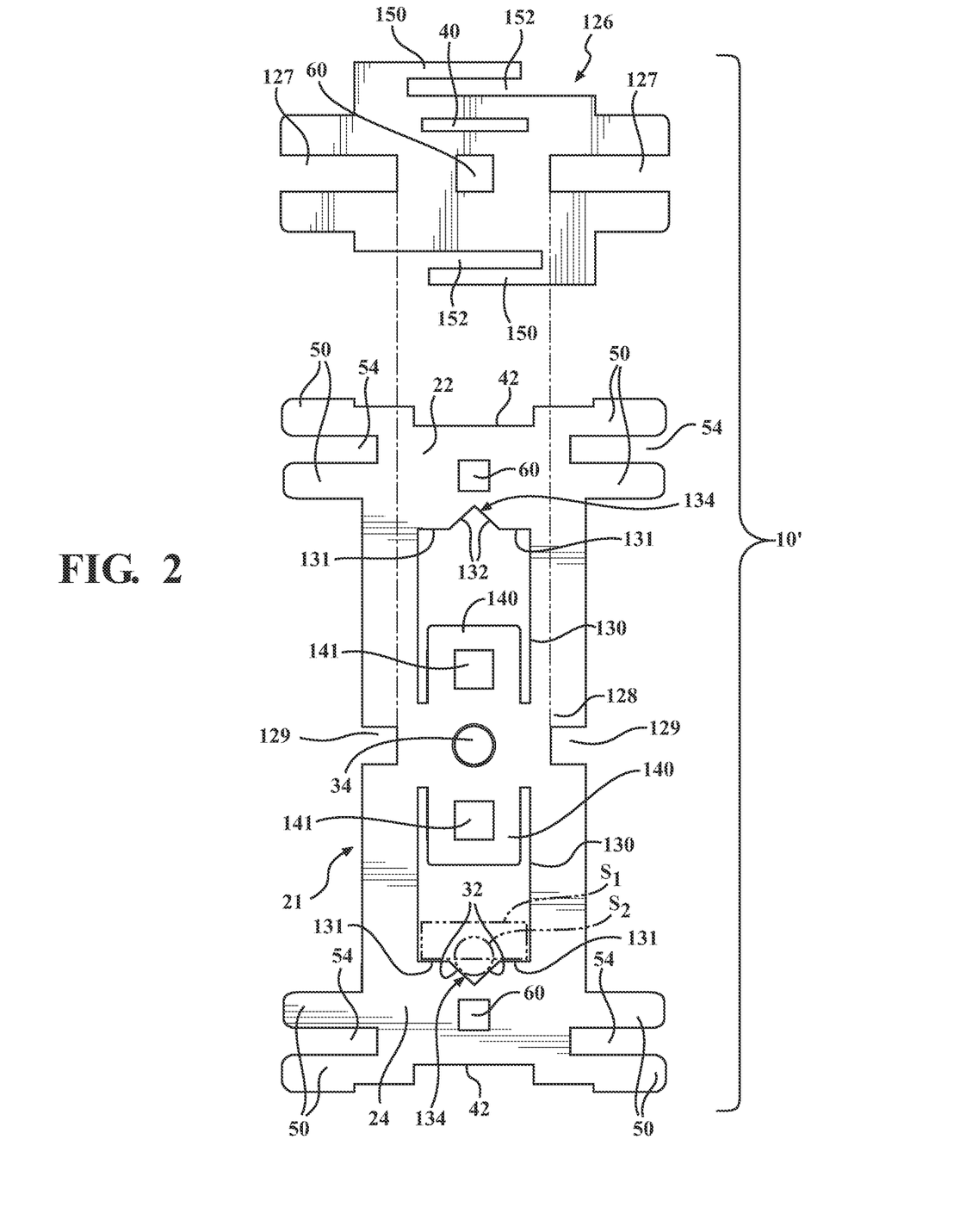
FIG. 2 is a plan view of a metal blank from which a trap-holding bracket according to the present invention is formed, with a modified rear wall and a first modified stake opening.

Referring now to FIG. 2, a modified bracket 10' is illustrated, similar to bracket 10 in FIGS. 1, 1A, and 1B, but with a modified rear end wall 128 (and preferably a complementary modified front plate 126) and modified vertical stake apertures or openings 130 through top and bottom walls 22, 24. Bracket 10' is secured to a stake S by a clamping member in the same manner illustrated and described above for bracket 10 in FIGS. 1, 1A, and 1B.

Openings 130 in modified bracket 10' have flat forward edges 131 generally parallel to the bracket front wall 26 extending inwardly toward a middle portion of the bracket, interrupted by angled forward edges 132 defining a small triangular forward projection 134. Larger square stakes S1 will fit flat against the forward edges 131 outside triangular projection 134. Smaller diameter round stakes S2 (or a corner of a non-round smaller stake) will be centered in the triangular forward projection 134 for a secure lock between the bracket 10' and the stake when the clamping member 36 (FIG. 3) is engaged with the stake through the rear aperture 34 in the bracket as described above.

Figure 2A:
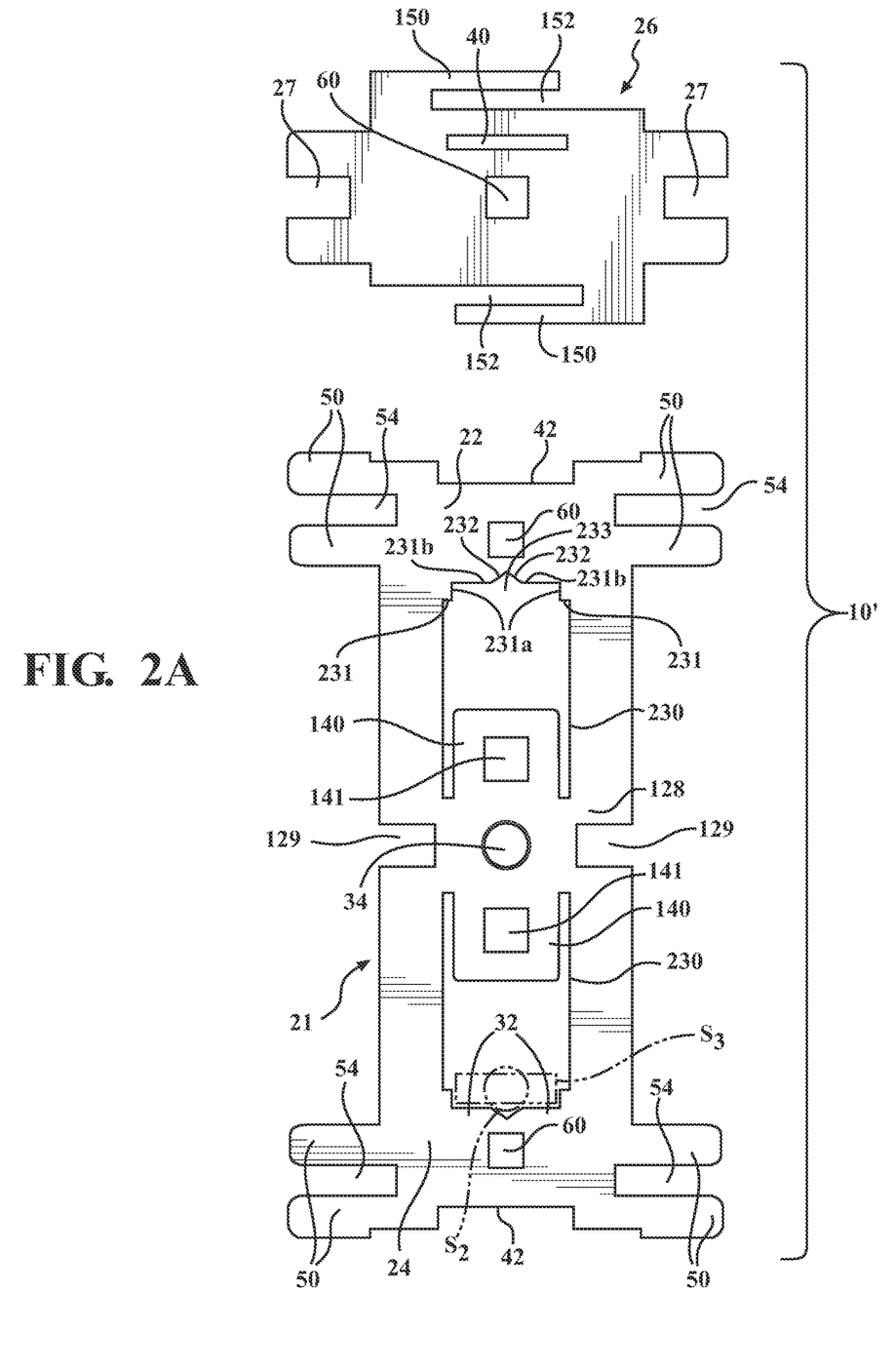
FIG. 2A is similar to FIG. 2, but showing a second modified stake opening.

FIG. 2A shows the modified bracket 10' with second modified vertical stake openings 230 in the top and bottom walls 22, 24. Flat forward edges 231 are interrupted toward the middle of the bracket, first by stepped edges 231a, 231b defining a shorter-width rectangular pocket 233 for receiving a flat face of a stake S3 having a width less than the width of the opening 230. The rectangular pocket is interrupted between stepped edges 231*b* by angled forward edges 232 defining a small triangular pocket 234 at the center of the aperture. The function of triangular forward pocket 234 is the same as triangular forward pocket 134 in FIG. 2, namely to receive a smaller-diameter round stake S2 (or a corner of a smaller stake) therein and center it securely in the aperture 230 when clamped from behind by clamping member 36.

Still referring to FIGS. 2 and 2A, modified rear wall 128 on bracket 10' comprises two side notches 129 whose inner ends 129*a* are generally aligned with the inner ends 127*a* of side notches 127 in front wall 126. In the illustrated example this alignment is achieved with a wider rear wall 128 and more-deeply cut notches 127 in the front wall on modified bracket 10' relative to the prior bracket 10. The aligned notches 129 and 127 are configured to secure the lower ends of the wire legs of a conibear trap in a "vertical" mount on the bracket 10', as described and shown better below with reference to FIGS. 3 and 3A.

Modified rear wall 128 on bracket 10' further comprises two vertical tabs 140 extending above and below central rear clamping member aperture 34, so that in the formed bracket 10' (FIG. 3) the tabs 140 provide fastener apertures 141 above and below the top and bottom walls 22, 24 of the box-like body of the formed bracket. These apertures allow the bracket 10' to be secured to a vertical mounting surface (stake, tree, board, etc.) with rear wall 128 flat against the vertical mounting surface and short fasteners inserted through apertures 141 into the vertical mounting surface.

While bracket 10 is generally illustrated herein as being mounted on either a vertical or horizontal stake P (FIGS. 1-1B) or S (FIGS. 2-3), bracket 10' may be mounted in a "vertical" orientation with front end wall 126 facing upwardly or downwardly, and one of the top or bottom walls 22, 24 held against the side of a tree or stump by either a wire or similar wrap device wrapped around the tree and through one or more of the apertures in bracket 10', or by a fastener F such as a screw or nail inserted through an aligned set of supplemental fastener apertures 60 formed in the top and bottom walls 22, 24 of the hollow body 20. Bracket 10' may also be mounted on a horizontal log L (FIG. 3A) in different orientations, also with a screw or nail fastener F inserted through aligned supplemental fastener apertures in the top and bottom walls 22, 24 of the bracket's hollow body 20. The flat faces of the top and bottom walls, and the aligned tab arms 50 extending from the sides of the top and bottom and front end walls, provide a wide, flat, stable support for the bracket against various mounting surfaces in different orientations.

Figure 3:
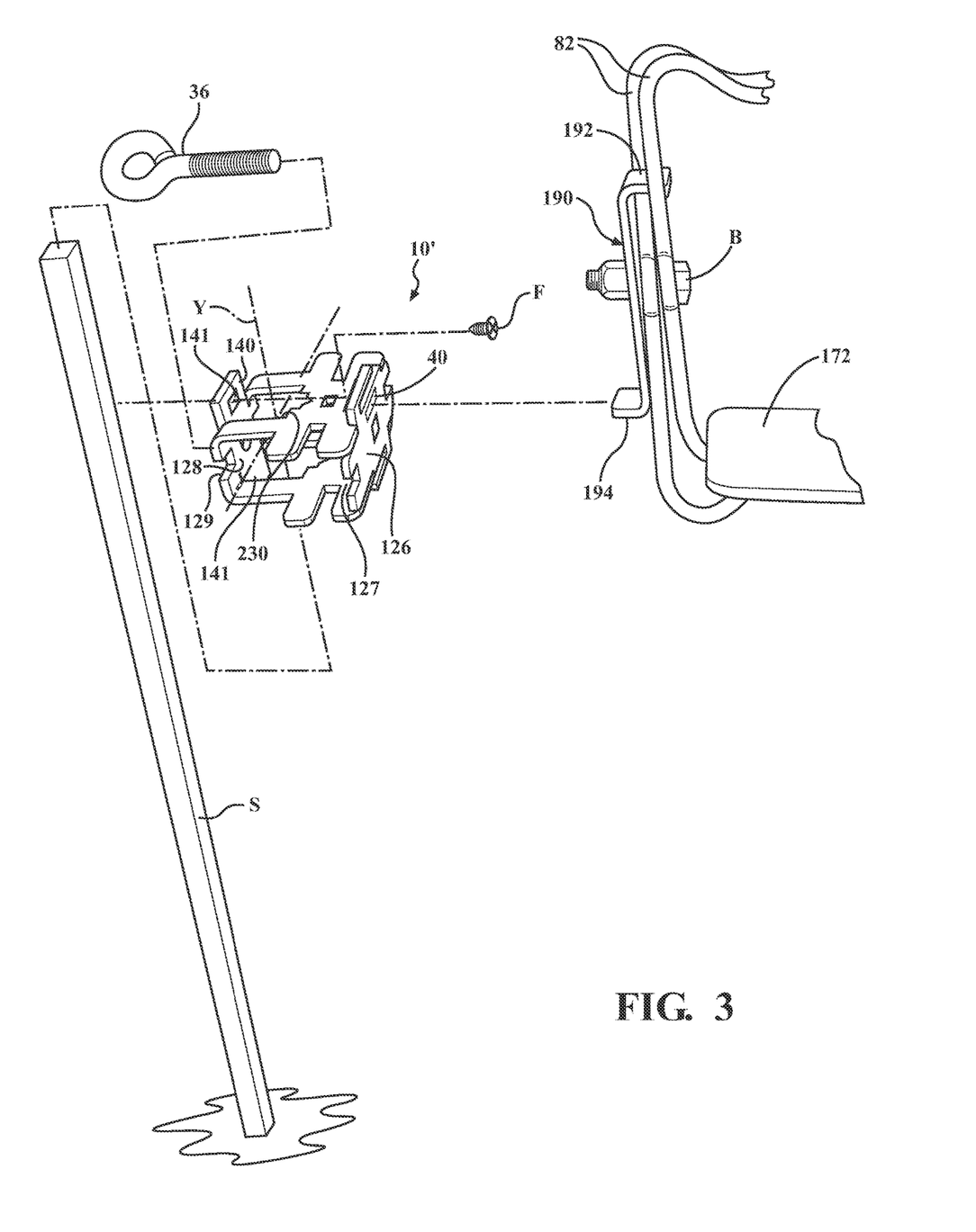
FIG. 3 shows the trap-holding bracket with a modified rear wall according to the present invention, formed from the blank of FIG. 3, exploded relative to a stake on which it is configured to be mounted.
Figure 3A:
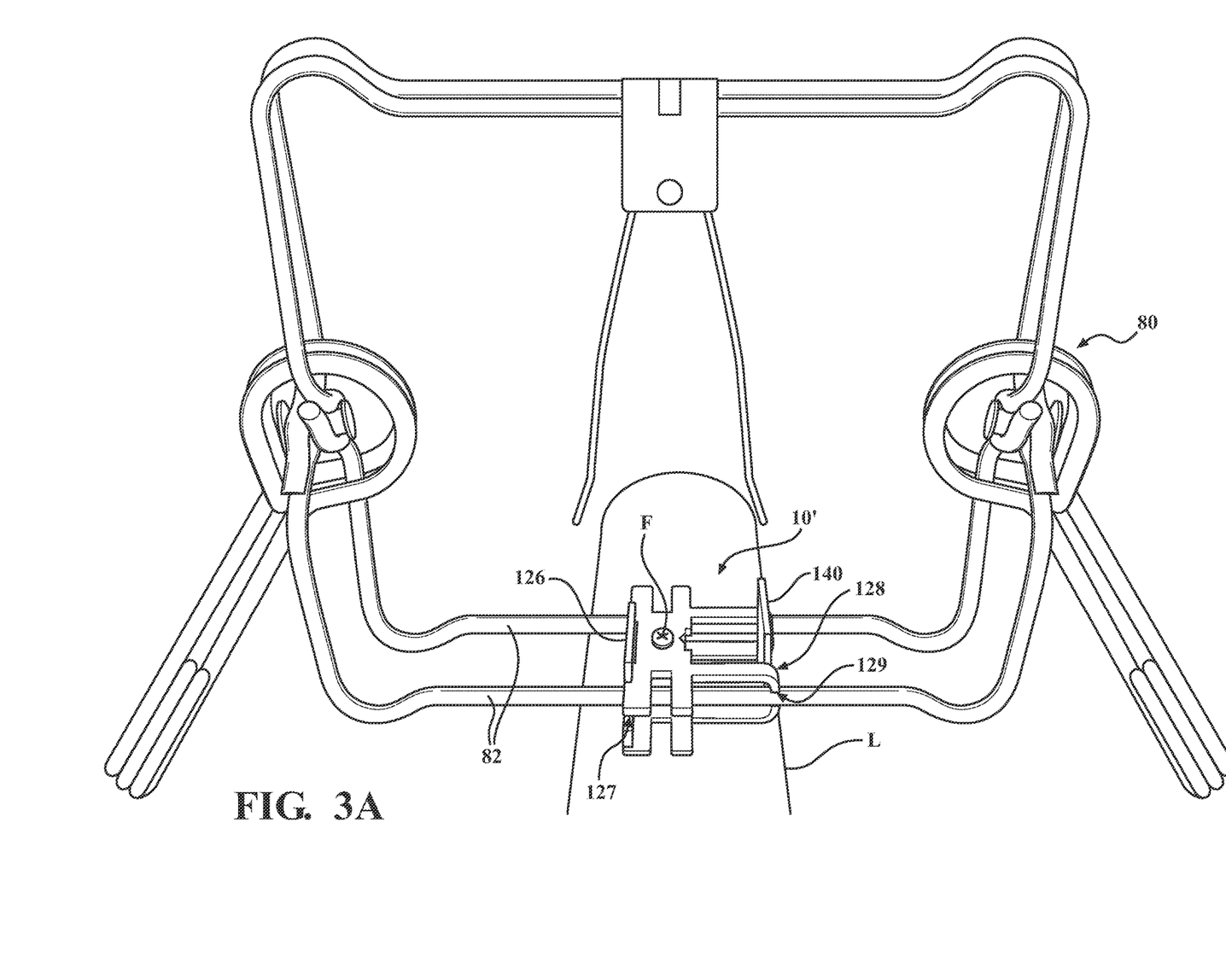
FIG. 3A shows the bracket of FIG. 3, mounted on a log and securing the legs of a conibear trap via the modified rear wall.

Referring now to FIGS. 3 and 3A, conibear traps such as the representative example shown at 80 in FIG. 3A are well known in the art, and generally include inner ends or legs 82 made of stiff rod or wire (hereafter "wire") capable of being forced inwardly toward one another under spring tension and locked in place by a known type of wire-and-dog trigger mechanism in known manner to set the trap. With bracket 10' secured on a generally horizontal mount such as a log L by a fastener such as a screw or nail F, the inner wire ends 82 of trap 80 can be squeezed together into aligned front and rear notches 129 and 127 to the trap's set position, and then locked in the set position in known manner. The horizontal spacing of notches 129 on the rear wall 128 and the aligned horizontal spacing of notches 127 on the bracket front wall 126 is such that the inner wire ends 82 in the trap's set position rest within the notches in a secure, level, generally horizontal position without tilting or rocking. The trap accordingly cannot be moved any significant amount either horizontally or vertically relative to bracket 10' until the trap is sprung, releasing inner ends 82 to open outwardly and exit the notches 129 and 127. At that point the trap 80 may fall free of bracket 10', but may be retained by a chain or similar connected to the bracket, or connected to the mounting surface such as log L, in known manner.

It should be understood that the vertical trap supporting orientation shown in FIG. 3A could be reversed, with bracket 10' mounted on the bottom of log L and facing downwardly to suspend trap 80 vertically downward rather than holding it vertically upward above the log.

Also shown in FIG. 3 is an anti-spin bar, comprising a vertical body 190 with an inward-facing horizontal tab 192 at its upper end and an outward-facing horizontal tab 194 at its lower end. The vertical bar body 190 is secured to the conibear trap with a bolt assembly B through a hole (not visible) in the vertical bar body. The bolt assembly B, which may be a nut and bolt or equivalent type connection, simply replaces the normal rivet that pivotally secures the wire legs 82 on each side of the trap, as shown in other Figs. The upper tab 192 fits between the spaced upper wire leg portions of the trap when the trap is set, while the lower tab 194 can be inserted in the slot 40 in the face of bracket 10'. The upper tab 192 prevents the set trap as a whole from rotating out of the vertical position while set, by stopping the upper portions of the wire legs from rotating in an inward direction past the tab, and is especially useful with the trigger-setting pan 172 described in more detail below with respect to FIGS. 5 and 5A.

Figure 4:
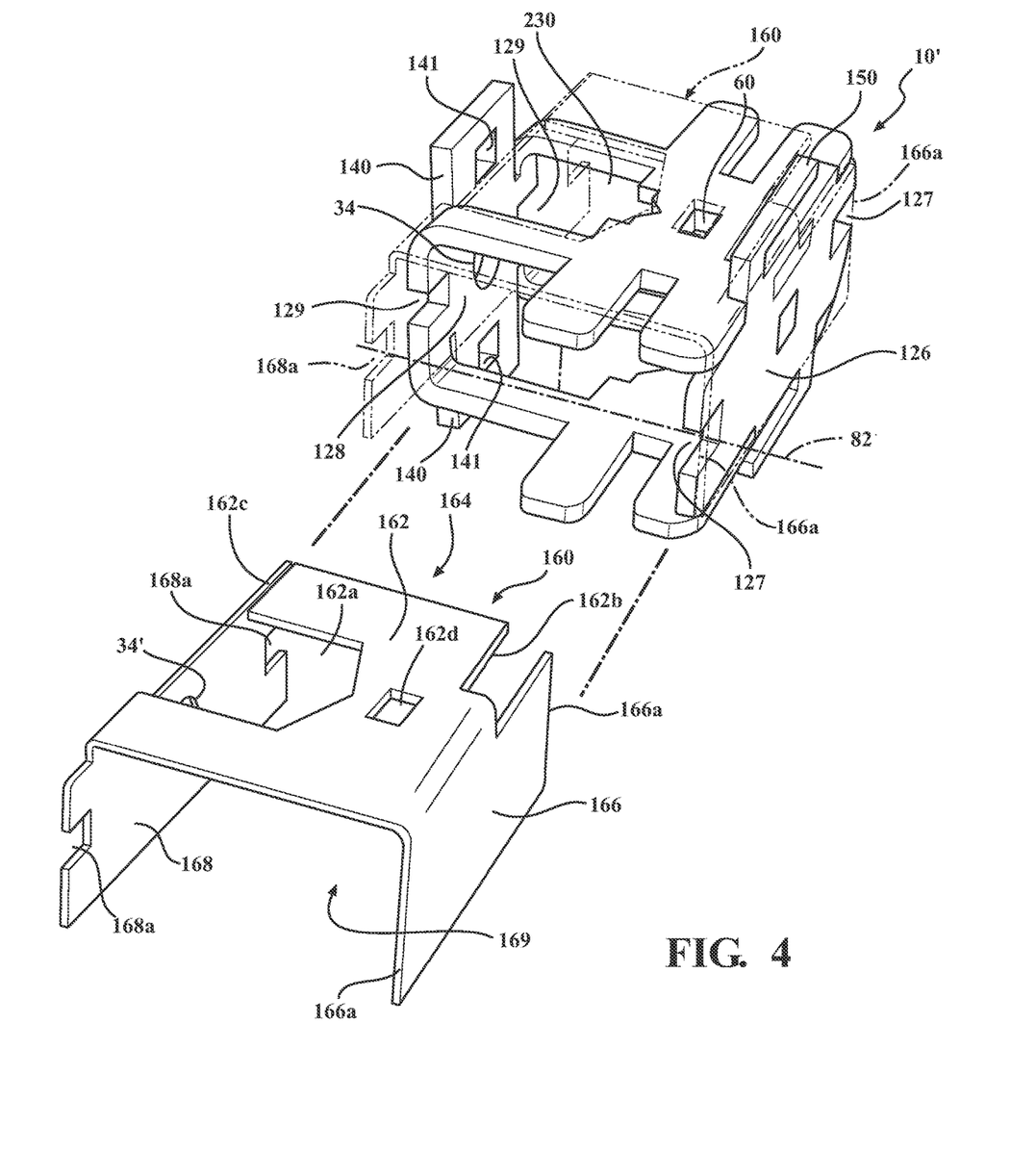
FIG. 4 is a perspective view of the bracket of FIG. 3, and an inventive adapter plate shown in exploded assembly (solid lines) and assembled (phantom lines), the adapter plate configured to allow the bracket to receive a wider conibear type trap.

Referring now to FIG. 4, the improved bracket system further includes a wide-jaw adapter plate 160 comprising a top wall 162 with a vertical stake opening 162*a*, the top wall having a lateral front slot 162*b* and a lateral rear slot 162*c* opening on an un-walled or open side 164 of the adapter plate. The adapter plate has a shorter front wall 166, a longer (wider) rear wall 168, and another side 169 which may be open/un-walled or closed with a wall, the opposite side of the adapter plate being the un-walled or open side 164. The rear wall 168 includes rear jaw-receiving notches 168*a* whose inner ends are aligned with the side edges 166*a* of the front wall of the adapter plate. The front wall 166 is wide enough that its side edges 166*a* are located over a midportion of the front jaw-receiving notches 127 on the front wall of the bracket 10', effectively widening the interior ends of the front jaw-receiving notches 127. The adapter plate 160 slides laterally over the bracket 10' via the un-walled or open side 164, with lateral slots 162*b* and 162*c* long enough to admit the front and rear raised tab portions 150 and 140 of the bracket until the stake apertures 162*a* and 230 and the vertical fastener apertures 162*d* and 60 on the adapter plate and bracket are aligned. A rear bolt aperture 34' in the rear wall 168 aligns with the bolt aperture 34 in the bracket 10' when the adapter plate is mated fully with the bracket.

Adapter plate 140 may be formed from a flat blank of metal, similar to the construction of bracket 10'. While the adapter plate 140 is shown with a vertical stake opening 162*a* having a pointed forward edge to match or approximate the point on the underlying aperture stake aperture in bracket 10', the adapter plate's upper stake aperture could have a straight forward edge or a different shape or size than the underlying bracket stake aperture.

Figure 5:
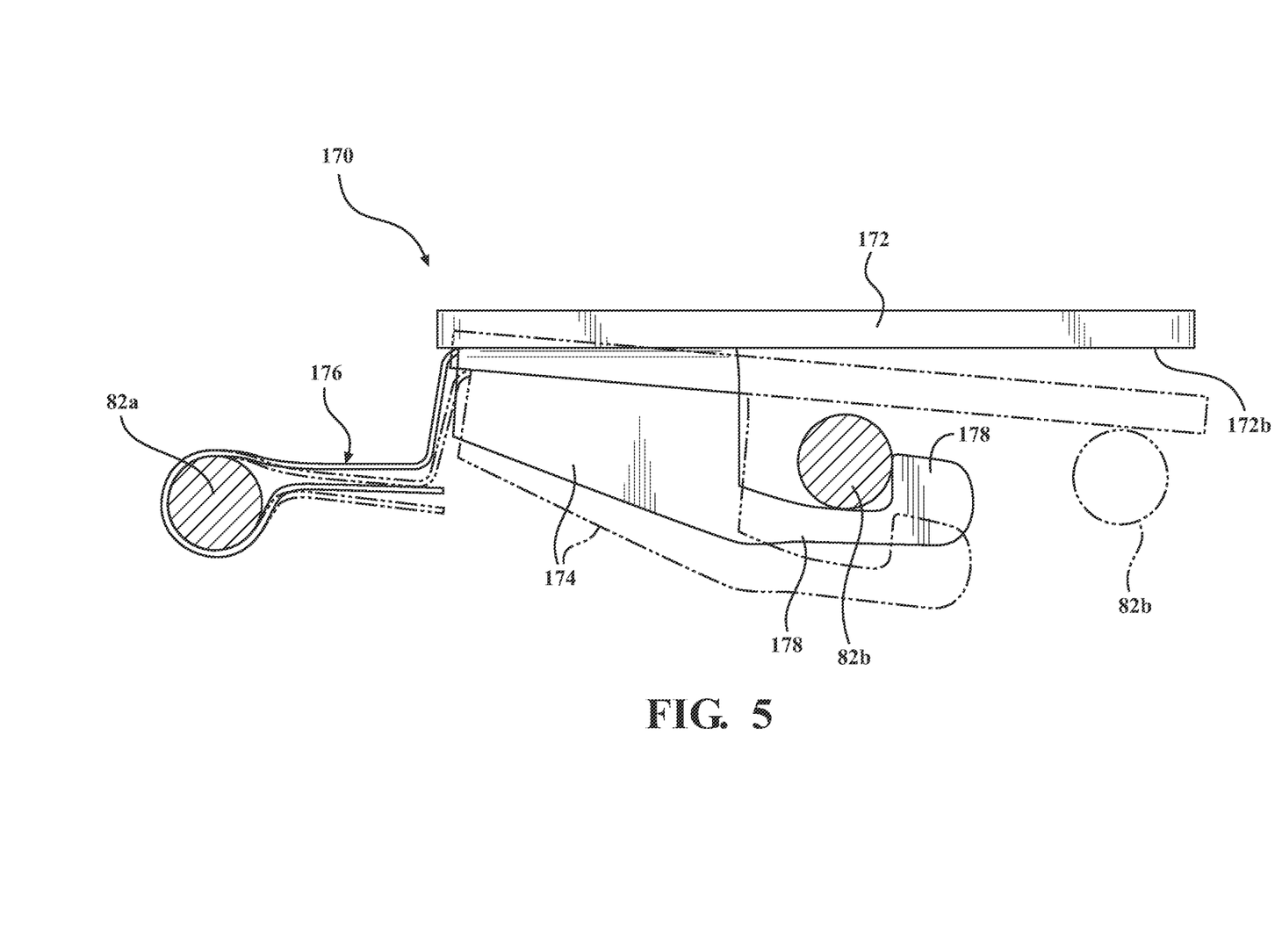
FIG. 5 is a side elevation view of the lower jaw legs of a conibear trap modified with an inventive trigger pan.
Figure 5A:
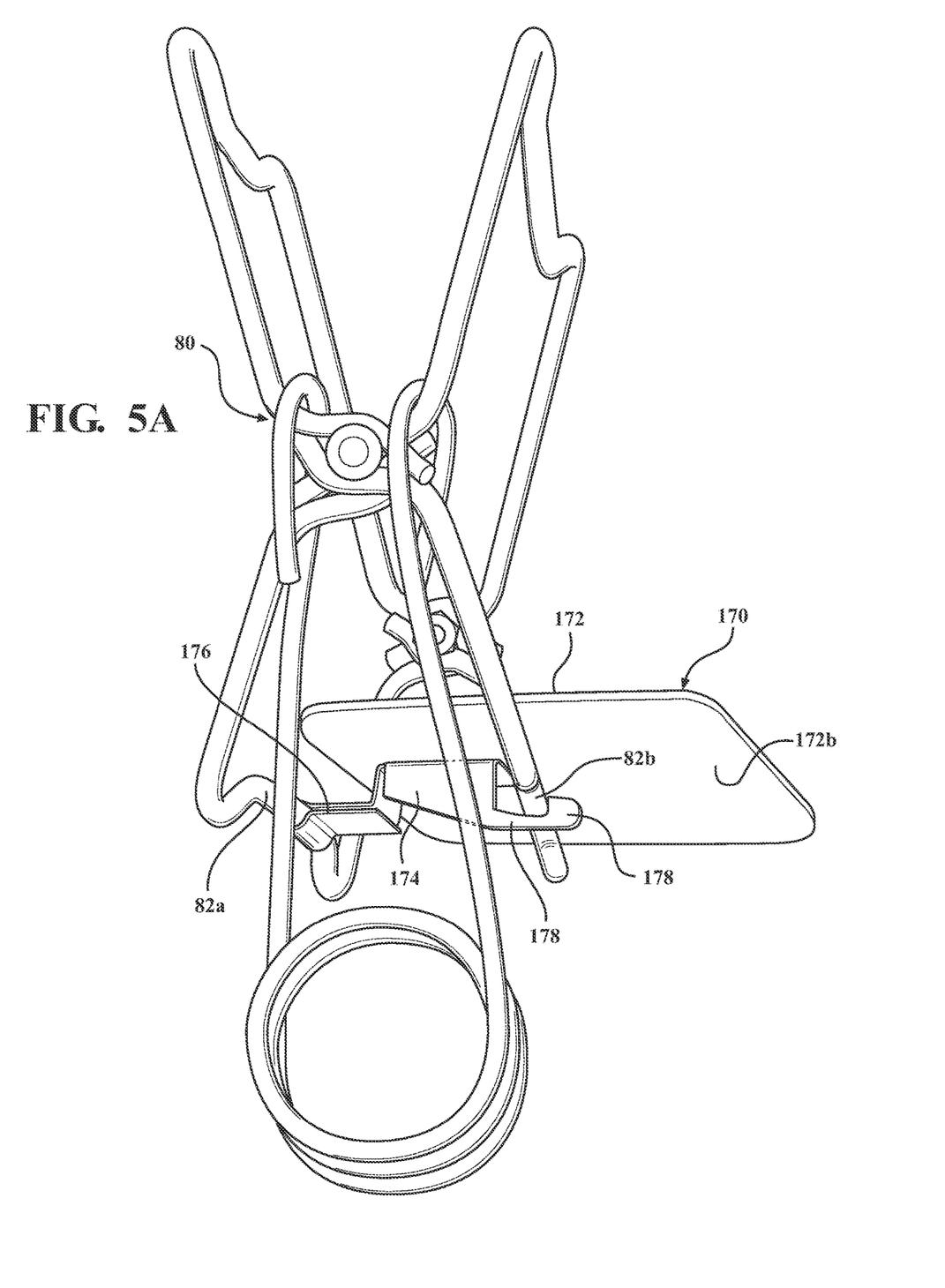
FIG. 5A is a perspective view of the lower portion of the conibear trap and trigger pan of FIG. 5.

Referring next to FIGS. 5 and 5A, the inventive system further includes an improved trigger-setting device 170 for a conibear-type trap, comprising a generally flat pan 172 having a hook member or pawl 174 on the bottom surface 172*b* of the pan, the pawl comprising a spring clip end 176 extending outwardly from a first side of the pan 172 to rotatably engage a lower end 82*a* of one of the wire jaws in a conibear trap 80, and an upwardly-facing trigger arm 178 extending partway along the bottom of the pan toward the opposite wire jaw, the trigger arm 178 having a trigger hook end 178*b* spaced from the bottom 172*b* of the pan to receive the opposite wire jaw lower end 82*b* under tension.

To set the trap, the pan 172 is rotated downwardly relative to the "free" wire jaw end 82*b*, and free wire jaw end 82*b* is squeezed to slide along the bottom 172*b* of the pan toward wire jaw end 82*a* until end 82*b* clears trigger hook end 178*b* sufficiently to be captured by the hook. The pan 172 is then rotated upward to catch and hold wire jaw end 82*b* with trigger hook 178*b* and set the trap. When an animal places weight on the pan 172, the pan rotates downwardly around wire jaw end 82*a* on spring clip 176 to free opposite wire jaw end 82*b* from trigger hook 178*b* and spring the trap.

Figure 6:
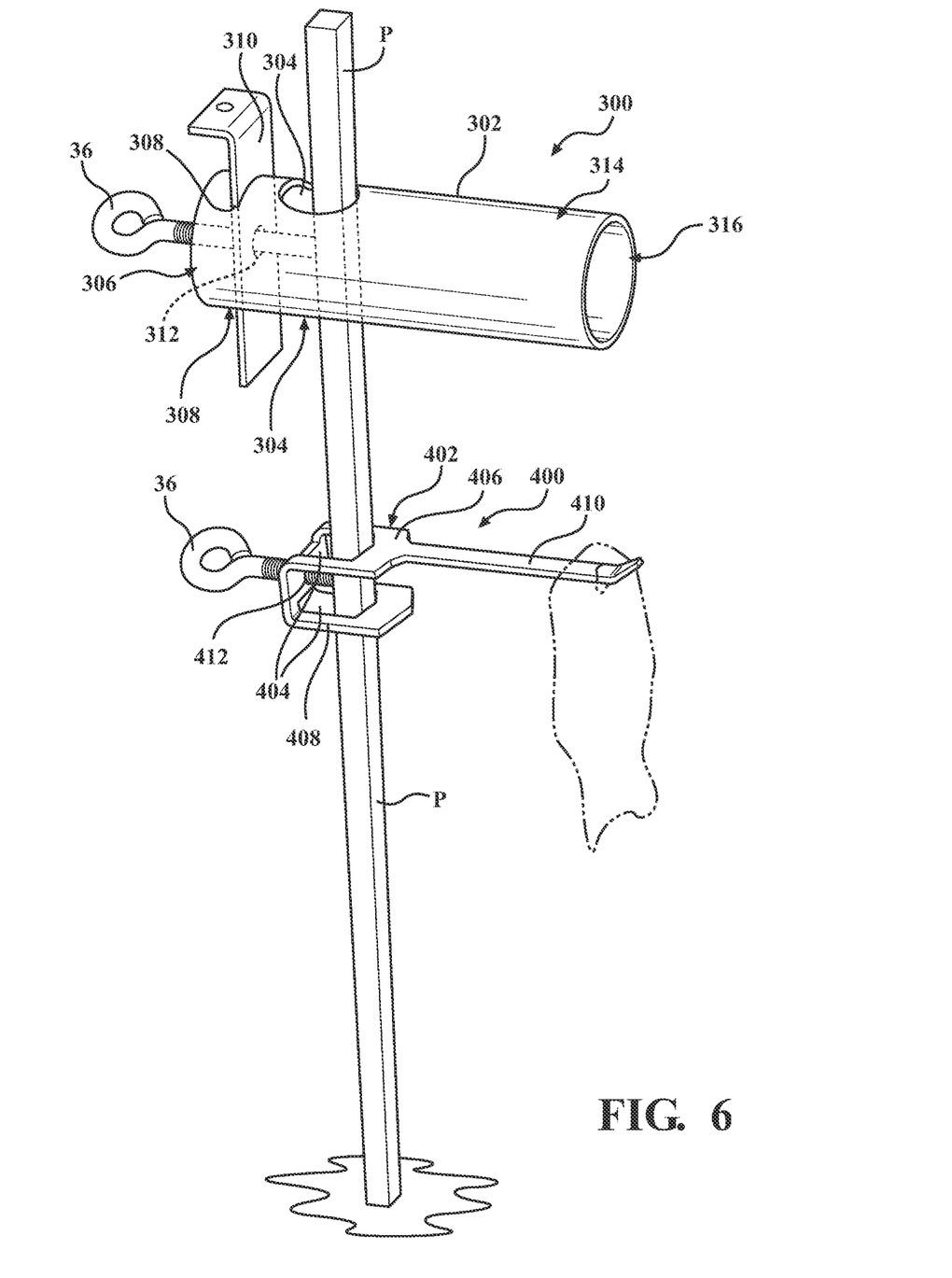
FIG. 6 is a perspective view of two bait holders according to the present invention shown mounted on a stake.

Referring now to FIG. 6, the inventive system further comprises a bait holder configured to be slidably and adjustably mounted on a vertical stake above a trap mounted on the stake by the bracket. In a first form, a bait holder 300 comprises an open-ended tubular body 302 with a pair of aligned stake apertures 304 through top and bottom sides of the tubular body adjacent a rear end 306 of the tubular body so that the tubular body 302 can be mounted to extend perpendicularly from the stake P. A pair of vertically aligned slots 308 is formed through the top and bottom sides of the tubular body rearwardly of the stake apertures 304, and a vertical bearing plate 310 with a bolt aperture 312 is inserted through the slots 308 to locate the bolt aperture 312 centrally in the bore of the hollow tubular body. A clamping bolt 36 inserted in the open rear end 306 of the tubular body (or through an aperture if the rear end 306 is closed) is centered by the bearing plate 310 adjacent the rear side of the stake P to engage the rear side of the stake and lock the bait holder 300 at a desired vertical position on the stake. The longer front portion 314 of the tubular body extends farther from the stake than the rear open end 306, and bait can be inserted into the hollow tubular body through the open front end 316.

In a second form, a bait holder 400 comprises a body 402 formed from a metal plate or blank, with a vertical stake passage defined by openings 404 in the top and bottom sides 406, 408 of the body. A bait-holding arm 410 extends horizontally forward from a front edge of the body 402, and a stake-engaging bolt 36 extends through an aperture 412 in the rear wall of the body against the rear side of stake P to selectively lock the bait holder 400 in place in a desired vertical position on the stake.

It will be understood by those skilled in the art that the various portions of the bracket and other system components described above can generally be formed from metal, for example heavy gauge stainless steel, although other metals or non-metal materials such as durable polymers could be used.

It will finally be understood that the disclosed embodiments represent presently preferred examples of how to make and use the invention, but are intended to enable rather than limit the invention. Variations and modifications of the illustrated examples in the foregoing written specification and drawings may be possible without departing from the scope of the invention. It should further be understood that to the extent the term "invention" is used in the written specification, it is not to be construed as a limiting term as to number of claimed or disclosed inventions or discoveries or the scope of any such invention or discovery, but as a term which has long been used to describe new and useful improvements in science and the useful arts. The scope of the invention supported by the above disclosure should accordingly be construed within the scope of what it teaches and suggests to those skilled in the art, and within the scope of any claims that the above disclosure supports in this application or in any other application claiming priority to this application.

The invention claimed is:

1. A trigger setting device for a conibear type trap having a wire spring trap with first and second pivotably connected spring biased wire jaw members, each having an inner wire leg member extending laterally between and connecting spaced upper side legs of its jaw member said trigger setting device comprising:
   a generally flat trigger pan positioned above said first and second inner wire jaw leg members and having a trigger pawl integral with and depending downwardly from the underside of said pan;
   said trigger pan being horizontally rotatably secured to said first wire jaw inner leg, said trigger pawl extending away from said first wire jaw inner leg toward said second wire jaw inner leg, said pawl having a trigger hook end spaced from said underside of the bottom of said trigger pan, said hook end opening upwardly toward said underside of said trigger pan and being spaced sufficiently far from said underside of said of said trigger pan that said second wire jaw inner leg can be inserted between said trigger hook and said underside of said trigger pan and lowered into said upwardly opening trigger hook end and held their under spring tension under said pan.

2. The trigger setting device of claim 1 additionally including a dual function anti-spin bar, comprising a vertical body with an inward-facing horizontal tab at its upper end and an outward-facing horizontal tab at its lower end; said upper inward facing tab fitting between said spaced upper wire leg portions of the trap when the trap is set, while said lower outward facing tab is configured to be inserted into a slot on a trap support thereby serving the function of mounting said trap on a trap support; and whereby said upper tab fitted between said spaced upper wire leg portions of said trap prevents the set trap as a whole from rotating out of the vertical position while set, by stopping the upper portions of the wire legs from rotating in an inward direction past said tab.

* * * * *